Figure 1:
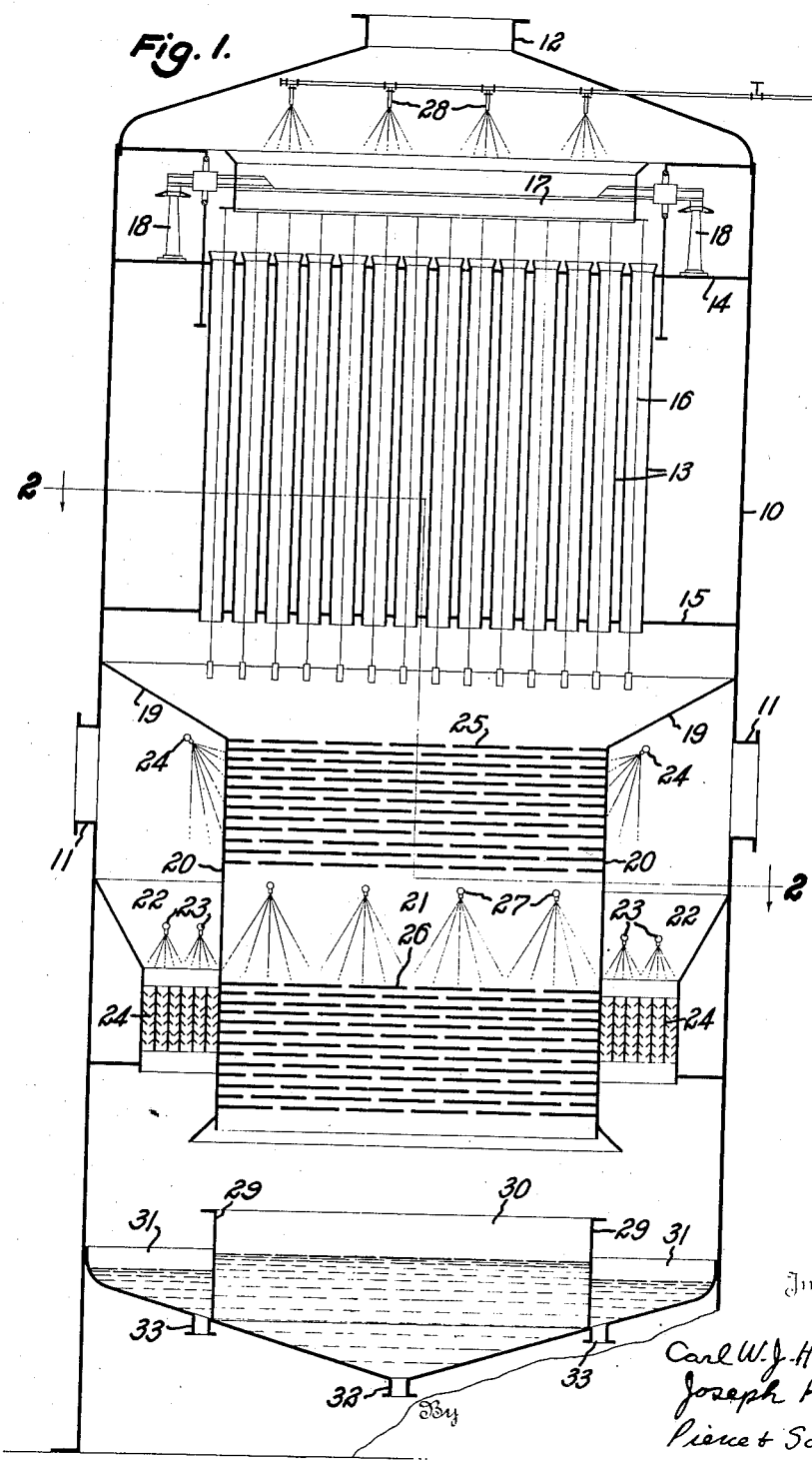

Feb. 17, 1942.   C. W. J. HEDBERG ET AL   2,273,194
GAS CLEANING
Filed March 11, 1941   2 Sheets-Sheet 2

Inventors:
Carl W. J. Hedberg
Joseph Phyl
Pierce & Scheffer
Attorneys.

Patented Feb. 17, 1942

2,273,194

UNITED STATES PATENT OFFICE 2,273,194

GAS CLEANING

Carl W. J. Hedberg, Bound Brook, and Joseph Phyl, Fanwood, N. J., assignors to Research Corporation, New York, N. Y., a corporation of New York Application March 11, 1941, Serial No. 382,814

14 Claims. (Cl. 183—7)

This invention relates to a method and apparatus for the treating and cleaning of gases. It is particularly directed to a method wherein a gas containing suspended particles is subjected to a succession of cooperating cooling, cleaning and treating operations adapted to remove effectively successive portions of the suspended particles of differing or progressively varying characteristics and to a unitary apparatus providing means for subjecting a gas to a succession of cleaning operations effective to remove different fractions of suspended material from the gas.

Many industrial gases, such, for example, as blast furnace gas, contain suspended particles varying substantially in size, specific gravity and other characteristics, and the most efficient removal of these particles requires a plurality of different treatments. A particular advantageous succession of treatments has been found to comprise a preliminary washing operation to remove coarser or more readily removable material, an intermediate treatment to cool the gas, preferably to a temperature which will bring about condensation of the water vapor introduced by the preliminary scrubbing operation and considerable of the natural water vapor carried by the dirty gas, or to remove a further portion of the material or both, and a final electrical treatment to remove substantially all the remaining suspended material from the gas.

A principal object of the invention is to provide a method and apparatus whereby such a succession of gas treatments may be carried out in a unitary apparatus of minimum height and floor space requirement.

Another object of the invention is the provision of a method and apparatus whereby a gas may be subjected to washing with a small amount of liquid to remove a major or substantial portion of suspended matter therefrom and thereafter to treatment with a further amount of liquid for cooling the gas and removing water vapor therefrom by condensation, which further amount of liquid may be separately collected for disposition or treatment independent of the first amount of liquid.

A further object of the invention is the provision of a gas treating apparatus wherein the gas may be subjected successively to an intensive washing treatment and to a wet electrical precipitation, in a minimum of floor space and head room.

These and other objects and advantages are provided by the invention, which in its apparatus aspect comprises a vertical casing, complementary electrode systems in the upper portion of the casing defining an inter-electrode space, intermediate gas scrubber means within the casing and below and directly communicating with the inter-electrode space, primary gas scrubber means within the casing below the inter-electrode space and communicating with the inter-electrode space solely through the intermediate gas scrubber means, means for separately collecting liquid supplied to the intermediate gas scrubber means and the primary gas scrubber means, and means for passing a stream of gas to be treated successively through the primary gas scrubber means, the intermediate gas scrubber means and the inter-electrode space.

It is particularly desirable to cause the gas under treatment to undergo a sharp change of direction in passing from the primary scrubber section into the intermediate scrubber section whereby centrifugal force arising in the change of direction may be utilized to bring about a more complete removal of the primary scrubber liquid and suspended material from the gas before passing into the intermediate scrubber.

Figure 2:
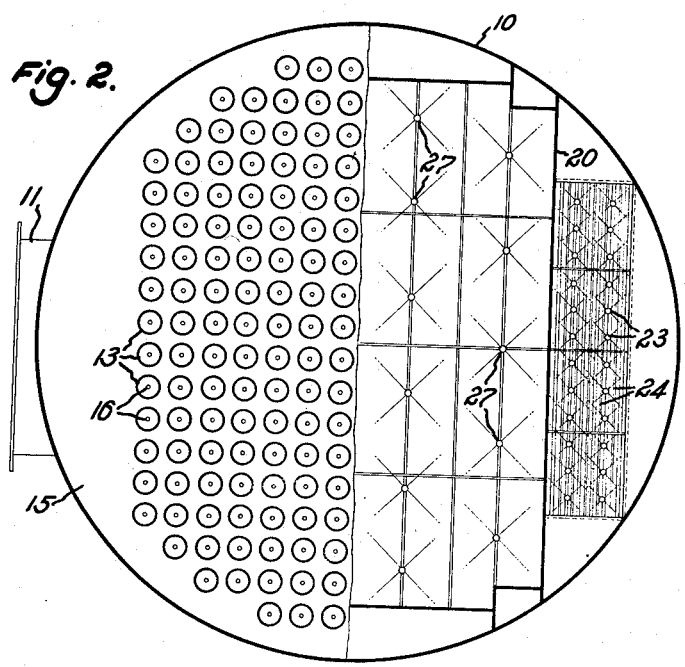

The invention will be more fully described with reference to the illustrative embodiment of the invention shown in the accompanying drawings in which:

Fig. 1 is a vertical sectional elevation of a gas treater embodying the principles of the invention; and Fig. 2 is a section on line 2—2 of Fig. 1.

In the drawings, 10 is a vertical cylindrical casing, provided with gas inlets 11 and gas outlet 12.

In the upper portion of the casing is provided an electrical precipitator, typically comprising a plurality of cylindrical collecting electrodes 13, supported by upper header sheet 14 and lower header sheet 15, and a plurality of discharge electrode members 16. The discharge electrodes are preferably wires centrally located in each of the collecting electrode cylinders and suspended from discharge electrode supporting assembly 17 which is carried on insulators 18. The complementary discharge and collecting electrodes are electrically energized by the means well known in the art of electrical precipitation.

The portion of the casing below the electrical precipitator is divided by partitions 19, 20 into a central section 21 and lateral segmental sections 22, intercommunicating at their lower ends. Gas inlets 11 open into the upper portions of lateral sections 22. Lateral sections 22 are provided with nozzles 23 positioned above baffle elements 24 to provide a high velocity confluent contact of washing liquid with gas flowing downward through sections 22. The gas washing elements in lateral sections 22 are preferably constructed in accordance with the principles of U. S. Patent 2,203,592 to Brundage to provide intensive gas washing with low gas pressure drop and relatively low liquid volumes. Spray nozzles 24 directed against partition members 20 effectively prevent the accumulation on the partition of deposited particles from the gas stream entering the apparatus through inlets 11.

Central section 21 is provided with baffle and spray members, comprising, for example, as shown in the drawings, an upper bank 25 and a lower bank 26 of wooden slat baffles of conventional staggered arrangement, and a plurality of downwardly directed spray nozzles 27 positioned between the upper and lower baffle banks. It is further advantageous to provide water distributing means as described in U. S. Patent No. 1,937,265 at the upper end of the electrical precipitator pipes for providing a continuous film of liquid on the interior of the electrodes for continuous removal of precipitated deposits. The contact of the gases with this liquid thus distributed over the large surface area of the precipitator pipes results in further desirable cooling of the gases and when the liquid drops from the lower ends of the pipes it is uniformly distributed over the baffles below and is thereby effectively employed not only for removing the deposited material from the electrode surfaces but also for cooling of the gases.

A particularly advantageous feature of the invention is the provision of partition members 29 to divide the lower portion of the casing into a central sump 30 positioned to collect the wash liquid from the electrical precipitator and the intermediate scrubber 21, and lateral sumps 31 positioned to collect the wash liquid from primary scrubbers 22. Suitable outlets 32 for the central sump and 33 for the lateral sumps are provided.

In operation of apparatus shown in the drawing, gas to be cleaned entering inlets 11 passes downward through scrubber sections 22 where it is subjected to intensive high velocity scrubbing with water or other scrubbing liquid. In this scrubber there is removed a major portion of the finer suspended particles which may be contained in the gas, together with the larger size suspended particles, which frequently may amount, on a weight basis, to all but a minor portion of the suspended material carried by the gas. The wash liquid from the preliminary scrubbing operation is collected in sumps 31. The sharp change in direction undergone by the gas in passing from sections 22 into section 21 around the lower edge of partition 20 brings about a more thorough separation of the droplets of washing liquid and of the larger particles of wetted suspended matter at this point.

Because of the effectiveness of the scrubbing and the relatively large proportion of the suspended material normally removed in the preliminary scrubbing operation, the liquid collected in sumps 31 contains the contaminants or the suspended values carried by the gas in relatively high concentration, and because of the separate collection of the concentrated wash liquid from this stage the liquid may be easily disposed of or treated to recover any values which it may carry.

From the preliminary scrubber the gas passes into the intermediate scrubber 21 where the gas is cooled for condensation of natural moisture and the water vapor added in the primary scrubbing and a further portion of the suspended material may also be removed by impact of the gas against the staggered baffle elements. The baffle members which are kept wetted by water from the sprays and that falling from the precipitator above in the intermediate scrubber also serve to distribute the flow of gas evenly so that the amount and velocity of gas flowing through each portion of the precipitator is substantially uniform.

The flushing liquid collected in sump 30 contains material precipitated from the gas stream in the electrical precipitator, together with any material removed from the gas by impingement on the baffles or by contact with flushing liquid in scrubber 21. The amount of contained solids will be small relative to that in the water from the primary scrubbing operation so that this liquid can be reused without intermediate treatment for removal of contained solids. A portion is pumped direct to sprays 23 for primary scrubbing and the remainder after cooling is pumped to sprays 27 for reuse as a cooling medium. Fresh make-up water in amounts corresponding to that used for the primary scrubber is delivered to the sprays 28 or other distributing means at the top of the precipitator pipes.

With this method of operation essentially all of the suspended solids contained in the gases are transferred to the primary scrubber liquor finally collected in sump 31. This liquor is then sent to settling tanks for removal of suspended solids after which it is preferably discarded to avoid a buildup of soluble solids in the scrubber liquor. The amount of liquid which is collected in sump 31 is only a fraction of the liquid employed throughout the apparatus so that relatively small settling or treating means is required.

Preferably, the relative cross-sectional areas of sections 21 and 22 of the apparatus are so selected that the gas velocity is considerably higher in the sections 22 than in section 21. The high gas velocity in sections 22 increases the effectiveness of the high velocity stream of liquid and also increases the removal of suspended particles by impingement and inertia effects. For example, the gas velocity in the primary scrubbers 22 may be 30 to 75 feet per second while the gas velocity in the intermediate scrubbers 21 may advantageously be 4 to 16 feet per second.

In applying the process to the cleaning and cooling of blast furnace gases, for example, from 3 to 8 gallons of recirculated water per 1000 cubic feet of gas (normal temperature and pressure) may be used in the primary scrubbers, from 3 to 8 gallons of fresh make-up water per 1000 cubic feet in the precipitator, and from 12 to 17 gallons of cooled recirculated water per 1000 cubic feet in the intermediate scrubber.

By means of this combined succession of cooperating treatments, each of the operations proceeds under optimum conditions and at its highest efficiency. Therefore, space requirements for the process and apparatus of the present invention are reduced not only because of the highly effective and space-saving arrangement of the operations in a unitary apparatus, but also because the cooperating effect of each operation on the others makes it possible to consider in each operation maximum efficiency rather than completeness of removal and thereby to reduce the size of each operational stage necessary to produce the desired cleansing of a given volume of gas and to facilitate suitable disposal of the used scrubber liquid.

We claim:

1. Apparatus for the treatment of gases comprising a vertical casing having an outlet in the upper portion thereof, complementary electrode systems in the upper portion of said casing spaced apart to provide an inter-electrode space, means for supplying flushing liquid to said inter-electrode space, extended surface baffle members positioned in the central portion of said casing immediately below said electrode systems and adapted to receive flushing liquid therefrom and to distribute the flow of gas uniformly over the inter-electrode space, high velocity liquid orifices and baffle members below and cooperating therewith, said orifices and cooperating baffle members being positioned in said casing laterally of said extended surface baffle members, partition members in said casing separating the space containing said extended surface baffle members from the space containing said orifices and cooperating baffle members, passages in said partition members below the level of said baffle members for the flow of gas through said partition members, gas inlets in said casing opening into the space containing said orifices, and sumps in the lower portion of said casing positioned to collect separately flushing liquid from said extended surface baffles and from said high velocity orifices and cooperating baffles.

2. Apparatus for the treatment of gases comprising a vertical casing having an outlet in the upper portion thereof, complementary electrode systems in the upper portion of said casing spaced apart to provide an inter-electrode space, means for supplying flushing liquid to said inter-electrode space, extended surface baffle members positioned in the central portion of said casing immediately below said electrode systems and adapted to receive flushing liquid therefrom and to distribute the flow of gas uniformly over the inter-electrode space, further liquid supply means positioned above at least a portion of said baffle members, high velocity liquid orifices and baffle members below and cooperating therewith, said orifices and cooperating baffle members being positioned in said casing laterally of said extended surface baffle members, partition members in said casing separating the space containing said extended surface baffle members from the space containing said orifices and cooperating baffle members, passages in said partition members below the level of said baffle members for the flow of gas through said partition members, gas inlets in said casing opening into the space containing said orifices, and sumps in the lower portion of said casing positioned to collect separately flushing liquid from said extended surface baffles and from said high velocity orifices and cooperating baffles.

3. Apparatus for the treatment of gases comprising a vertical, cylindrical casing having an outlet in the upper portion thereof, complementary electrode systems in the upper portion of said casing spaced apart to provide an inter-electrode space, means for supplying flushing liquid to said inter-electrode space, extended surface baffle members positioned in the central portion of said casing immediately below said electrode systems and adapted to receive flushing liquid therefrom and to distribute the flow of gas uniformly over the inter-electrode space, high velocity liquid orifices and baffle members below and cooperating therewith, said orifices and cooperating baffle members being positioned in at least one segmental section of said casing laterally of said extended surface baffle members, partition members in said casing separating the space containing said extended surface baffle members from the space containing said orifices and cooperating baffle members, passages in said partition members below the level of said baffle members for the flow of gas through said partition members, gas inlets in said casing opening into the space containing said orifices, and sumps in the lower portion of said casing positioned to collect separately flushing liquid from said extended surface baffles and from said high velocity orifices and cooperating baffles.

4. Apparatus for the treatment of gases comprising a vertical casing, complementary electrode systems in the upper portion of said casing spaced apart to define an inter-electrode space, intermediate gas scrubber means within said casing and below and directly communicating with said inter-electrode space, primary gas scrubber means within said casing below said inter-electrode space and communicating therewith solely through said intermediate gas scrubber means, means for separately collecting liquid supplied to said intermediate gas scrubber means and said primary gas scrubber means, and means for passing a stream of gas to be treated successively through said primary gas scrubber means, said intermediate gas scrubber means and said inter-electrode space.

5. Apparatus for the treatment of gases comprising a vertical cylindrical casing having a gas outlet in the upper portion thereof, an electrical precipitator in the upper portion of said casing, partitions in said casing below said electrical precipitator dividing the lower portion of the casing into a central chamber, the upper part of which is in direct communication with said electrical precipitator, and lateral segmental chambers closed from direct communication with said electrical precipitator, baffle members in said central and said lateral chambers, said partitions including gas passage connecting said lateral chambers with said central chamber below said baffles, means for supplying flushing liquid above the baffles in said lateral chambers, means for supplying flushing liquid above at least a portion of the baffles in said central chamber, and sump means in the lower portion of said casing for separately collecting liquid from said central chamber and from said lateral chambers.

6. Apparatus for the treatment of gases comprising a vertical cylindrical casing having a gas outlet in the upper portion thereof, an electrical precipitator in the upper portion of said casing, partitions in said casing below said electrical precipitator dividing the lower portion of the casing into a central chamber, the upper part of which is in direct communication with said electrical precipitator, and lateral segmental chambers closed from direct communication with said electrical precipitator, baffle members in said central and said lateral chambers, said partitions including gas passage connecting said lateral chambers with said central chamber below said baffles, means for supplying flushing liquid above the baffles in said lateral chambers, means for supplying flushing liquid above said electrical precipitator, and sump means in the lower portion of said casing for separately collecting liquid from said central chamber and from said lateral chambers.

7. Method of treating blast furnace gases and the like which comprises rough-cleaning the gas by contact with a high velocity confluent stream of water, collecting the wash water from said rough-cleaning operation, sharply altering the direction of flow of the gas, further cleaning the gas by contact with an extended surface stream of water flowing counter-current to the flow of the gas, and finally cleaning the gases by subjecting them to the action of an electric field in the presence of an extended surface stream of water, collecting together the water from said second cleaning and said electrical cleaning and separately collecting the water from said rough-cleaning operation.

8. A method as defined in claim 7 wherein at least a portion of the extended surface stream of water contacted with the gases in the second cleaning operation is first contacted with the gas in the electrical cleaning operation.

9. Method of treating blast furnace gases and the like which comprises rough-cleaning the gas by contact at a velocity of about 30 to 75 feet per second with a high velocity confluent stream of water, collecting the wash water from said rough-cleaning operation, sharply altering the direction of flow of the gas, further cleaning the gas by contact at a velocity of about 4 to 16 feet per second with an extended surface stream of water flowing counter-current to the flow of the gas, and finally cleaning the gases by subjecting them to the action of an electric field in the presence of an extended surface stream of water, collecting together the water from said second cleaning and said electrical cleaning and separately collecting the water from said rough-cleaning operation.

10. Method of treating blast furnace gases and the like which comprises rough-cleaning the gas by contact at a velocity of about 30 to 75 feet per second with a high velocity confluent stream of water amounting to about 3 to 8 gallons per 1000 cubic feet of gas, collecting the wash water from said rough-cleaning operation, sharply altering the direction of flow of the gas, further cleaning the gas by contact at a velocity of about 4 to 16 feet per second with an extended surface stream of water amounting to about 5 to 25 gallons per 1000 cubic feet of gas flowing counter-current to the flow of the gas, and finally cleaning the gases by subjecting them to the action of an electric field in the presence of an extended surface stream of water, collecting together the water from said second cleaning and said electrical cleaning and separately collecting the water from said rough-cleaning operation.

11. A method as defined in claim 10 wherein from 3 to 8 gallons per 1000 cubic feet of gas of the extended surface stream of water in the second cleaning operation is first contacted with the gas in the electrical cleaning operation.

12. A method as defined in claim 10 wherein from about 3 to 8 gallons per 1000 cubic feet of gas of the water collected from said second cleaning is supplied to provide the high velocity confluent stream of water in said rough-cleaning operation.

13. Method of treating blast furnace gases and the like which comprises rough-cleaning the gas by contact with a high velocity confluent stream of water, collecting the wash water from said rough-cleaning operation, sharply altering the direction of flow of the gas, cooling and further cleaning the gas by contact with an extended surface stream of water flowing counter-current to the flow of the gas, and finally cleaning the gases by subjecting them to the action of an electric field in the presence of an extended surface stream of water, collecting together the water from said second cleaning and said electrical cleaning and separately collecting the water from said rough-cleaning operation.

14. Method of treating blast furnace gases and the like which comprises rough-cleaning the gas by contact at a velocity of about 30 to 75 feet per second with a high velocity confluent stream of water amounting to about 3 to 8 gallons per 1000 cubic feet of gas, collecting the wash water from said rough-cleaning operation, sharply altering the direction of flow of the gas, cooling and further cleaning the gas by contact at a velocity of about 4 to 16 feet per second with an extended surface stream of water amounting to about 5 to 25 gallons per 1000 cubic feet of gas flowing counter-current to the flow of the gas, and finally cleaning the gases by subjecting them to the action of an electric field in the presence of an extended surface stream of water, collecting together the water from said second cleaning and said electrical cleaning and separately collecting the water from said rough-cleaning operation.

CARL W. J. HEDBERG.
JOSEPH PHYL.